(12) United States Patent  
Pott et al.

(10) Patent No.: US 7,853,397 B2
(45) Date of Patent: Dec. 14, 2010

(54) METHOD OF OPERATING AN INTERNAL COMBUSTION ENGINE

(75) Inventors: Ekkehard Pott, Gifhorn (DE); Jörg Theobald, Lehre (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 12/627,561

(22) Filed: Nov. 30, 2009

(65) Prior Publication Data

US 2010/0131178 A1  May 27, 2010

Related U.S. Application Data

(63) Continuation of application No. PCT/EP2008/002922, filed on Apr. 12, 2008.

(30) Foreign Application Priority Data

May 30, 2007 (DE) .................. 10 2007 025 076

(51) Int. Cl.
*F02D 41/00* (2006.01)
*F02B 13/00* (2006.01)
(52) U.S. Cl. ...................... 701/103; 123/575
(58) Field of Classification Search ......... 701/103–105; 123/575, 578, 1 A, 531
See application file for complete search history.

(56) References Cited

U.S. PATENT DOCUMENTS

| 4,333,739 | A | * | 6/1982 | Neves ................ 123/1 A |
| 4,876,988 | A | * | 10/1989 | Paul et al. ........... 123/1 A |
| 5,379,740 | A | | 1/1995 | Moore et al. |
| 5,775,282 | A | | 7/1998 | Smith |
| 6,035,837 | A | | 3/2000 | Cohen et al. |
| 6,047,671 | A | | 4/2000 | Tubb et al. |

(Continued)

FOREIGN PATENT DOCUMENTS

DE 69628979 T2 2/2004

(Continued)

OTHER PUBLICATIONS

International Search Report dated Sep. 19, 2008.

(Continued)

*Primary Examiner*—Hieu T Vo
(74) *Attorney, Agent, or Firm*—Laurence A. Greenberg; Werner H. Stemer; Ralph E. Locher

(57) ABSTRACT

A method relates to operating an internal combustion engine in the form of an Otto engine, especially of a motor vehicle. Otto engine fuel (i.e., carburetor fuel, spark ignition engine fuel), such as gasoline or ethanol (E85), are directly injected into at least one combustion chamber of the internal combustion engine with at least one fuel injector. Optionally, instead of injecting ignition spark engine fuel or in addition, the internal combustion engine is operated with gas, especially CNG (compressed natural gas) or LPG (liquefied petroleum gas). During operation of the internal combustion engine with gas only, the engine is automatically switched to the operation with spark ignition engine fuel for a predetermined period, or the engine is switched to the operation with spark ignition engine fuel in addition to the operation with gas, in such a manner that a predetermined quantity of the carburetor fuel flows through the at least one fuel injector. The engine is then automatically switched back to the operation with gas only.

24 Claims, 2 Drawing Sheets

U.S. PATENT DOCUMENTS

| | | | |
|---|---|---|---|
| 6,481,422 B2 * | 11/2002 | Artioli | 123/531 |
| 7,159,568 B1 | 1/2007 | Lewis et al. | |
| 7,343,895 B2 | 3/2008 | Mark | |
| 7,480,556 B2 * | 1/2009 | Jauss et al. | 701/104 |

FOREIGN PATENT DOCUMENTS

| | | |
|---|---|---|
| DE | 102006060851 A1 | 5/2007 |
| DE | 102006056389 A1 | 6/2008 |
| EP | 0718484 A2 | 6/1996 |
| JP | 56-69449 A * | 6/1981 |
| JP | 2004239213 A | 8/2004 |
| WO | 9208888 A1 | 5/1992 |
| WO | 9535441 A1 | 12/1995 |
| WO | 0026521 A1 | 5/2000 |
| WO | 2004087196 A1 | 11/2004 |
| WO | 2005031149 A1 | 4/2005 |

OTHER PUBLICATIONS

German Search Report dated Mar. 25, 2008.

* cited by examiner

METHOD OF OPERATING AN INTERNAL COMBUSTION ENGINE

CROSS-REFERENCE TO RELATED APPLICATION

This application is a continuation, under 35 U.S.C. §120, of copending international application No. PCT/EP2008/002922, filed Apr. 12, 2008, which designated the United States; this application also claims the priority, under 35 U.S.C. §119, of German patent application No. DE 10 2007 025 076.4, filed May 30, 2007; the prior applications are herewith incorporated by reference in their entirety.

BACKGROUND OF THE INVENTION

1. Field of the Invention

The invention relates to a method for operating an internal combustion engine in the form of an Otto engine (i.e., a spark ignition engine, carburetor engine), in particular of a motor vehicle. Otto engine fuel—referred to as carburetor fuel or spark ignition engine fuel in the following—in particular gasoline or ethanol (E85), is injected directly into at least one combustion space of the internal combustion engine by means of at least one fuel injector, and the internal combustion engine is selectively operated, instead of with the injection of carburetor fuel or in addition to the injection of carburetor fuel, by means of gas, in particular CNG (compressed natural gas) or LPG (liquefied petroleum gas).

In an Otto engine with direct gasoline injection, the high-pressure injection injectors for injecting liquid carburetor engine fuels issue directly into the combustion space. Consequently, when the engine is in operation, the injectors are acted upon with hot combustion gases as a result of combustion taking place in the combustion space and are heated up. The injectors are cooled by the injected fuel and the engine cooling water ducts running in direct proximity to the injector. When such a direct-injection carburetor engine is operated with CNG (compressed natural gas), as is known, for example, from U.S. Pat. No. 5,755,211 and European patent EP 0 718 484 B1, there is the risk that, during CNG operation, the high-pressure injectors heat up due to the lack of throughput of liquid fuel and are consequently damaged or the fuel still located inside the injectors forms deposits which, in turn, have an adverse effect on the injector behavior. The longer gas operation with deactivated gasoline injection continues, the greater is the risk that deposits from the stationary fuel occur inside the injector and are detrimental to a correct operation of the injector.

It is known from U.S. Pat. No. 6,047,671 and European patent EP 0 761 961 B1, in order to avoid deposits in the injector valve, to add a lubricant and/or cleaning agent to the fuel upstream of the fuel injector or directly in the fuel injector.

SUMMARY OF THE INVENTION

It is accordingly an object of the invention to provide a method of operating an internal combustion engine which overcomes the above-mentioned disadvantages of the heretofore-known devices and methods of this general type and which is improved with regard to the operating reliability of the fuel injectors.

With the foregoing and other objects in view there is provided, in accordance with the invention, a method of operating an internal combustion engine, such as an Otto engine in a motor vehicle. The method comprises:

injecting carburetor fuel (e.g., gasoline or ethanol E85) directly into a combustion space of the internal combustion engine by way of at least one fuel injector;

selectively operating the internal combustion engine, instead of with the injection of carburetor fuel or in addition to the injection of carburetor fuel, with gas;

during an operation of the internal combustion engine solely with gas, effecting an automated changeover to operation with carburetor fuel for a predetermined time span or to mixed operation with carburetor fuel and gas in order to conduct a predetermined quantity of carburetor fuel to flow through the at least one fuel injector; and subsequently automatically switching back to the operation of the internal combustion engine solely with gas.

The gas for gas operation or mixed gas and liquid fuel operation may be compressed natural gas (CNG) or liquefied petroleum gas (LPG).

In other words, the objects of the invention are achieved with a method in which, during the operation of the internal combustion engine solely with gas, there is an automated changeover to operation with carburetor fuel for a predetermined time span in such a way or operation with carburetor fuel is hooked up to operation with gas in such a way that a predetermined quantity of carburetor fuel flows through the at least one fuel injector, subsequently there being an automated switch back again to operation solely with gas.

The advantage of this is that, even in gas operation, the fuel injectors are sufficiently cooled, and, where appropriate, deposits present on or in the fuel injectors are removed even when they occur. This achieves an increase in robustness of bivalent gas engines by diminishing persistent coking on the fuel injectors.

Expediently, the changeover to operation with carburetor fuel or the hooking up of operation with carburetor fuel takes place in predetermined operating phases of the internal combustion engine, for example during idling, when an overrun cut-off phase is initiated and/or when an overrun cut-off phase is terminated, and/or under predetermined operating conditions of the internal combustion engine, for example above a coolant temperature of 40° C.

After a predetermined operating phase and/or a predetermined operating condition has occurred in which the changeover to operation with carburetor fuel or the hooking up of operation with carburetor fuel is to take place, preferably a predetermined dead time of, for example, 2 seconds to 10 seconds, in particular 5 seconds, elapses until the changeover to operation with carburetor fuel or the hooking up of operation with carburetor fuel actually takes place.

In a preferred embodiment, the predetermined quantity of carburetor fuel which flows through the at least one fuel injector during the carburetor fuel injection phase activated in an automated manner comprises part of, the entire and/or a multiple of the volume of carburetor fuel stored in a fuel injector.

Expediently, the multiple of the volume of carburetor fuel stored in a fuel injector comprises 2 to 200 times, in particular 3 to 5 times, the volume stored in a fuel injector.

In a preferred embodiment, a thermal load upon the at least one fuel injector during operation with gas is determined as a function of the engine operating point and also is weighted and integrated over time, the automated changeover to and/or the hooking up of the injection of carburetor fuel taking place during operation with gas when this thermal load overshoots a predetermined threshold value.

After the carburetor fuel injection phase activated in an automated manner, preferably a predetermined blocking time of, for example, 200 seconds to 40,000 seconds, in particular 2000 seconds to 10,000 seconds, in particular 5000 seconds, elapses before a renewed automated activation of carburetor fuel injection is permitted.

After a predetermined maximum time of, for example, 500 seconds to 60,000, in particular 3000 seconds to 15,000 seconds, in particular 6000 seconds, of the operation of the internal combustion engine with gas, during which no automated activation of the injection of carburetor fuel has taken place, the injection of carburetor fuel is activated in an automated manner independently of the operating state and operating parameters of the internal combustion engine.

In accordance with a concomitant feature of the invention, the time span for the maximum time preferably starts to run only from the end of a blocking time.

Other features which are considered as characteristic for the invention are set forth in the appended claims.

Although the invention is illustrated and described herein as embodied in a method for operating an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
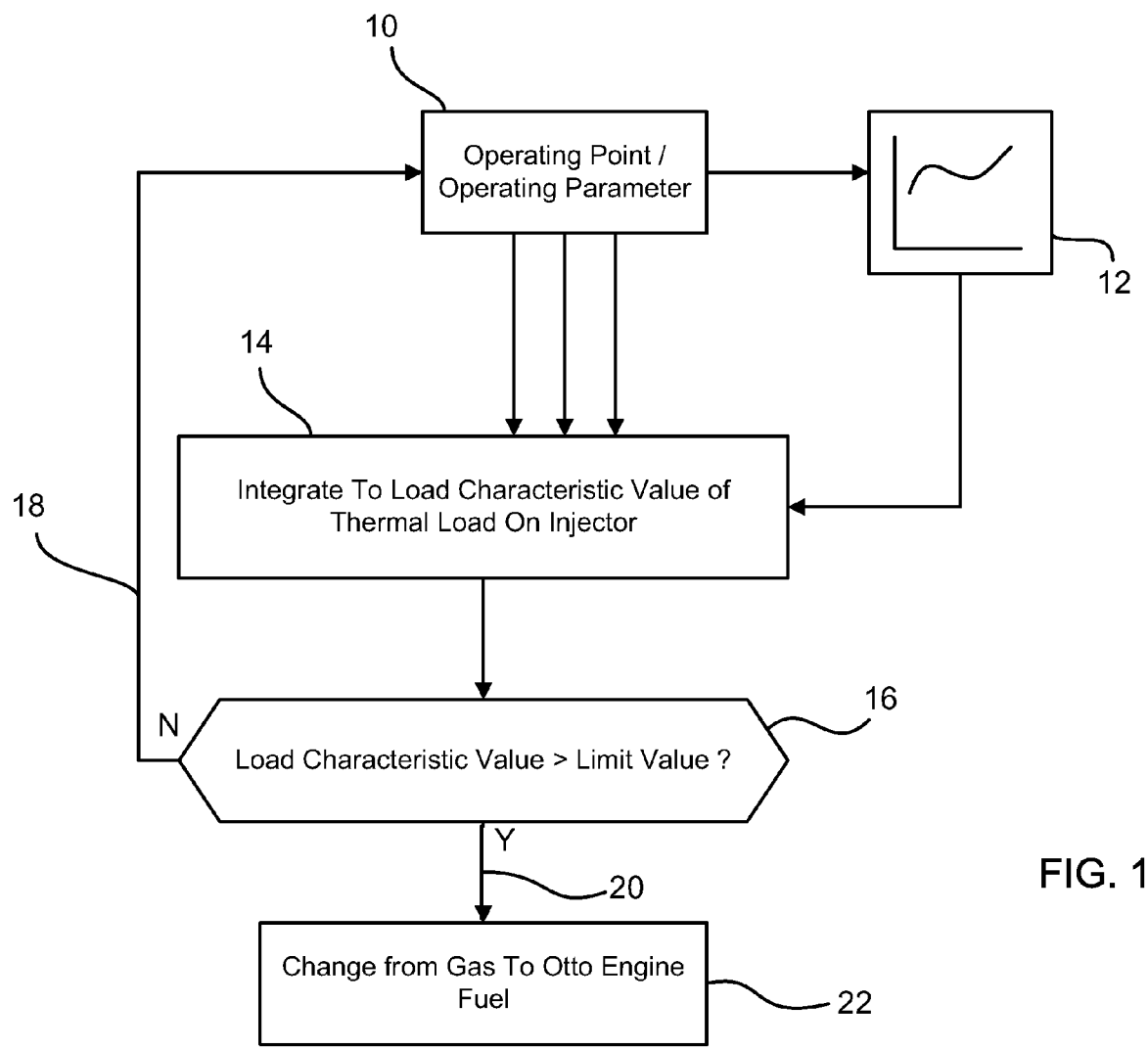
FIG. 1 shows a diagrammatic flow chart of a preferred embodiment of a method according to the invention.

Referring now to the figures of the drawing in detail, an exemplary embodiment of a method according to the invention for operating a bivalent internal combustion engine, that is to say an internal combustion engine which can be operated selectively with a carburetor fuel (gasoline or ethanol) injected out of fuel injectors into combustion spaces of the internal combustion engine or with gas (CNG or LPG) preferably introduced into a suction pipe of the internal combustion engine will now be described with reference to the flow chart of FIG. 1.

In a function block 10 ("operating point/operating parameter"), an operating point and operating parameters, such as, for example, temperatures, of the internal combustion engine are determined and are fed both to a weighting characteristic map 12 and to a function block 14 ("integration to a load characteristic value of the thermal load upon the injector"). A thermal load upon the fuel injectors is stored in weighting characteristic map 12 as a function of the operating point and operating parameters, such as, for example, an engine temperature.

This thermal load upon the fuel injectors which is determined in this way is fed to the function block 14 in which this value is integrated to a load characteristic value over time. The result of this integration is compared in a subsequent function block 16 ("load characteristic value>limit value") with a predetermined limit value or threshold value. If the load characteristic value determined in the function block 14 is lower than or equal to the limit value, the system returns to the function block 10 via branch 18. If, on the other hand, the load characteristic value determined in the function block 14 is higher than the limit value, the system proceeds via a branch 20 to function block 22 "operating mode changeover: from gas to carburetor fuel operation"), in this case there is temporarily and periodically a regulated or controlled changeover from gas operation to carburetor fuel operation or carburetor fuel operation is hooked onto gas operation, until at least part of, preferably the entire carburetor fuel volume, in particular more than the carburetor fuel volume inside the fuel injector, has been injected, so that the injector is cooled by the inflowing fuel and deposits are avoided. Subsequently, there is a switch back to gas operation again by means of the engine control.

The changeover by the engine control unit preferably takes place on the basis of a stored strategy: the empirical thermal load upon the high-pressure fuel injector during the gas operation of the engine as a function of the engine operating point as stored in the weighting characteristic map 12, is integrated in time and weighted. From a threshold value, the changeover from gas to carburetor fuel and back again to gas (scavenging process, flushing) is carried out. Preferably, in this case, carburetor fuel operation is provided when an overrun cut-off phase is initiated and/or terminated.

The carburetor fuel quantity injected cumulatively during the changeover or hooking up of carburetor fuel injection (scavenging process) amounts, for example, to at least the carburetor fuel volume of the injector, so that a complete scavenging or flushing of the injector takes place. It is preferable, however, to scavenge 2 to 100 times the volume, ideally 3 to 5 times the volume.

In this scavenging phase there is selectively straightforward carburetor fuel operation or mixed carburetor fuel/gas operation.

Preferably, the scavenging process takes place during idling, preferably above a predeterminable minimum coolant temperature of, for example, 40° C. After idling operation is detected, first, straightforward gas operation is maintained for an applicable dead time of 2 seconds to 10 seconds, ideally 5 seconds before the scavenging process, that is to say the temporary activation of carburetor fuel injection, commences.

Advantageously, after the conclusion of a scavenging process, a blocking time is defined in which no further scavenging process is triggered even in the event of renewed occurrence of idling operation. This blocking time amounts, for example, to 200 seconds to 40,000 seconds, optimally 2000 seconds to 10,000 seconds, in particular around 5000 seconds.

If no scavenging process has taken place during idling within a predetermined period of time after the blocking time, a scavenging process is initiated, independently of the operating state of the internal combustion engine, after a maximum time has elapsed. This maximum time lies, for example, around 500 seconds to 60,000 seconds, optimally 3000 seconds to 15,000 seconds, in particular around 6000.

Scavenging processes, once begun, are preferably not interrupted, but are continued independently of the operating state of the internal combustion engine.

Figure 2:
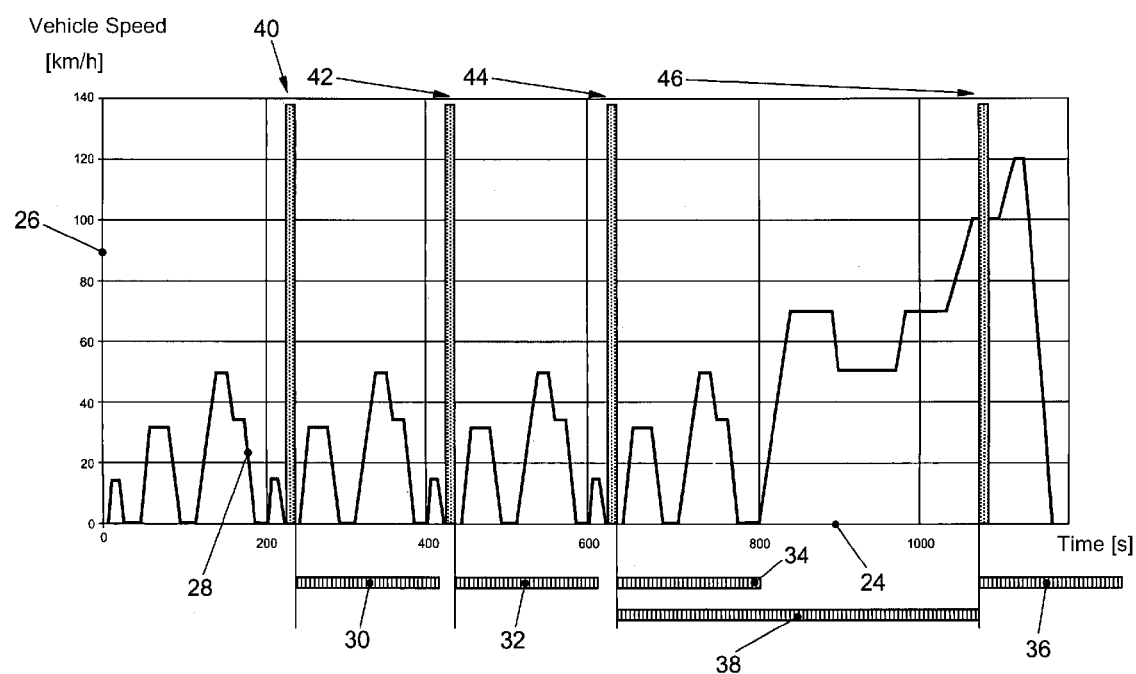
FIG. 2 shows a graphic illustration of the sequence of an NEFZ driving profile.

FIG. 2 illustrates the triggering according to the invention of scavenging processes during a so-called NEDC driving cycle (New European Driving Cycle)—better known under the German acronym NEFZ driving profile (NEFZ: Neuer Europäischer Fahrzyklus). In this case, first, the internal combustion engine is operated solely with gas, and a scavenging process is to be triggered, without a preceding dead time, whenever idling occurs and the engine temperature lies above 40° C. The time t is plotted in seconds on the horizontal axis 24 and a vehicle speed $v_{fzg}$ is plotted in km/h on the vertical axis 26. A graph 28 illustrates the vehicle speed $v_{fzg}$ against the time t during the NEFZ driving profile. At 30, 32, 34 and 36, in each case a blocking time is active which suppresses a triggering of phases with carburetor fuel operation (scavenging process). Numeral 38 designates a maximum time after which a phase with carburetor fuel operation is forced, even though there is no idling. Numerals 40, 42, 44 and 46 designate operating phases in which scavenging takes place, that is to say phases with carburetor fuel operation.

During the first approximately 210 s of the NEFZ, the engine temperature is still below 40° C., therefore an activation of carburetor fuel operation is suppressed. The internal combustion engine is operated solely with gas. After the first scavenging phase 40, the blocking time 30 initially prevents further phases with carburetor fuel operation in spite of idling. Only during the second scavenging phase 42 has the blocking time 30 elapsed. The same applies to the next blocking time 32 and the third scavenging phase 44. After this third scavenging phase 44, the blocking time 34 initially prevents further phases with carburetor fuel operation in spite of the occurrence of idling phases. After somewhat more than 800 seconds, the blocking time 34 has elapsed, but idling phases no longer occur, and therefore no phases with carburetor fuel operation are initiated. Only after the expiry of the maximum time 38 is a fourth scavenging phase 46 forced, even though there is no idling. Thereafter a blocking time 36 is active again which suppresses further phases with carburetor fuel operation until the end of the NEFZ at 1180 seconds.

The invention claimed is:

1. A method of operating an internal combustion engine, the method which comprises:
   injecting carburetor fuel directly into a combustion space of the internal combustion engine by way of at least one fuel injector;
   selectively operating the internal combustion engine, instead of with the injection of carburetor fuel or in addition to the injection of carburetor fuel, with gas;
   during an operation of the internal combustion engine solely with gas, effecting an automated changeover to operation with carburetor fuel for a predetermined time span or to mixed operation with carburetor fuel and gas in order to conduct a predetermined quantity of carburetor fuel to flow through the at least one fuel injector; and
   subsequently automatically switching back to the operation of the internal combustion engine solely with gas.

2. The method according to claim 1, wherein the internal engine is an Otto engine in a motor vehicle.

3. The method according to claim 1, wherein the carburetor fuel is gasoline or ethanol (E85).

4. The method according to claim 1, wherein the gas is compressed natural gas (CNG) or liquefied petroleum gas (LPG).

5. The method according to claim 1, wherein the changeover to operation with carburetor fuel or the mixed operation with carburetor fuel is effected in predetermined operating phases and/or under predetermined operating conditions of the internal combustion engine.

6. The method according to claim 5, wherein the predetermined operating phases are selected from the group consisting of idling, an initiation of an overrun cut-off phase, and a termination of an overrun cut-off phase of the internal combustion engine.

7. The method according to claim 5, which comprises, after a predetermined operating phase and/or a predetermined operating condition has occurred in which the changeover to operation with carburetor fuel or the mixed operation with gas and carburetor fuel is to take place, allowing a predetermined dead time to elapse until the changeover to operation with carburetor fuel is effected or the mixed operation with gas and carburetor fuel actually takes place.

8. The method according to claim 7, wherein the predetermined dead time amounts to between 2 seconds and 10 seconds.

9. The method according to claim 7, wherein the predetermined dead time amounts to 5 seconds.

10. The method according to claim 5, wherein the predetermined operating conditions comprise a coolant temperature of at least 40° C.

11. The method according to claim 1, which comprises setting the predetermined quantity of carburetor fuel to flow through the at least one fuel injector during the carburetor fuel injection phase to a portion of the volume of carburetor fuel stored in a fuel injector.

12. The method according to claim 1, which comprises setting the predetermined quantity of carburetor fuel to flow through the at least one fuel injector during the carburetor fuel injection phase to an entire and/or a multiple of a volume of carburetor fuel stored in the fuel injector.

13. The method according to claim 12, wherein the multiple of the volume of carburetor fuel stored in a fuel injector comprises 2 to 200 times the volume stored in a fuel injector.

14. The method according to claim 12, wherein the multiple of the volume of carburetor fuel stored in a fuel injector comprises 3 to 5 times the volume stored in a fuel injector.

15. The method according to claim 1, which comprises determining a thermal load upon the at least one fuel injector during operation with gas as a function of an engine operating point and also weighting the thermal load and integrating over time, and automatically changing over to and/or starting mixed operation with the injection of carburetor fuel during the operation with gas when the thermal load overshoots a predetermined threshold value.

16. The method according to claim 1, which comprises, following an automatically activated carburetor fuel injection phase, blocking a further automated activation for a predetermined blocking time before a renewed automated activation of carburetor fuel injection is permitted.

17. The method according to claim 16, which comprises setting the blocking time to between 200 seconds and 40,000 seconds.

18. The method according to claim 17, which comprises setting the blocking time to between 2000 seconds and 10,000 seconds.

19. The method according to claim 17, which comprises setting the blocking time to approximately 5000 seconds.

20. The method according to claim 1, which comprises, after a predetermined maximum time of operation of the internal combustion engine with gas, during which no automated activation of the injection of carburetor fuel has taken place, activating the injection of carburetor fuel in an automated manner independently of an operating state and operating parameters of the internal combustion engine.

21. The method according to claim 20, wherein the maximum time amounts to between 500 seconds and 60,000 seconds.

22. The method according to claim 21, wherein the maximum time amounts to between 3000 seconds and 15,000 seconds.

23. The method according to claim 21, wherein the maximum time amounts to approximately 6000 seconds.

24. The method according to claim 21, which comprises, following an automatically activated carburetor fuel injection phase, blocking a further automated activation for a predetermined blocking time before a renewed automated activation of carburetor fuel injection is permitted, and starting the maximum time to run only after the end of a blocking time.

* * * * *